US008712257B2

(12) United States Patent
Uwatoko

(10) Patent No.: US 8,712,257 B2
(45) Date of Patent: Apr. 29, 2014

(54) IMAGE FORMING SYSTEM, PROGNOSIS CRITERION SETTING APPARATUS, PROGNOSIS APPARATUS, IMAGE FORMING APPARATUS AND NON-TRANSITORY COMPUTER-READABLE RECORDING MEDIUM

(75) Inventor: Koki Uwatoko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 453 days.

(21) Appl. No.: 13/093,434

(22) Filed: Apr. 25, 2011

(65) Prior Publication Data

US 2012/0140262 A1    Jun. 7, 2012

(30) Foreign Application Priority Data

Dec. 6, 2010  (JP) .................................. 2010-271824

(51) Int. Cl.
*G03G 15/00* (2006.01)
(52) U.S. Cl.
USPC ............................................................ 399/9
(58) Field of Classification Search
USPC ...................................................... 399/8–10
See application file for complete search history.

(56) References Cited

U.S. PATENT DOCUMENTS

| | | | | |
|---|---|---|---|---|
| 7,457,550 | B2 * | 11/2008 | Shoji et al. ......................... | 399/9 |
| 8,064,782 | B2 * | 11/2011 | Nakazato et al. ................. | 399/9 |
| 8,190,037 | B2 * | 5/2012 | Nakazato et al. ................. | 399/9 |
| 2005/0002054 | A1 | 1/2005 | Shoji et al. | |

FOREIGN PATENT DOCUMENTS

| | | |
|---|---|---|
| JP | A-2005-17874 | 1/2005 |
| JP | A-2009-289221 | 12/2009 |

* cited by examiner

*Primary Examiner* — William J Royer
(74) *Attorney, Agent, or Firm* — Oliff PLC

(57) ABSTRACT

An image forming system includes first and second generation units, a setting unit, and a prognosis unit. For a monitoring item whose detection values, being detected during an image forming operation in an image forming apparatus in which a trouble occurred within a predetermined time period after an operating condition was changed, were changed to an abnormal state, the first generation unit generates characteristic information indicating a variation state of the detection values. The setting unit sets criterion information to predict occurrence of a trouble, based on the generated characteristic information. The second generation unit generates, for the monitoring item corresponding to the set criterion information, characteristic information indicating a variation state of detection values in a target image forming apparatus. The prognosis unit predicts whether a trouble occurs after the operating condition is changed, based on a difference between the set criterion information and the characteristic information generated.

10 Claims, 14 Drawing Sheets

*FIG. 3*

| OPERATING CONDITION | STATE |
|---|---|
| SHEET TYPE | NORMAL SHEET<br>COAT SHEET<br>CARDBOARD<br>COLOR SHEET<br>⋮ |
| ONE SIDE/DUPLEX | ONE SIDE<br>BOTH SIDES |
| COLOR MODE | BLACK/WHITE<br>COLOR |
| SHEET SIZE | A3<br>A4<br>A5<br>B4<br>B5<br>⋮ |
| ⋮ | ⋮ |

FIG. 6

| CATEGORY | TROUBLE TYPE | MONITORING ITEM |
|---|---|---|
| IMAGE QUALITY | TROUBLE a<br>TROUBLE b<br>⋮ | PARAMETER 1<br>PARAMETER 2<br>⋮ |
| SHEET TRANSPORT SYSTEM | TROUBLE o<br>TROUBLE p<br>⋮ | PARAMETER 1<br>PARAMETER 3<br>⋮ |
| ELECTRIC SYSTEM | TROUBLE x<br>TROUBLE y<br>⋮ | PARAMETER 5<br>PARAMETER 6<br>⋮ |

THE CASE WHERE A TROUBLE (SHEET JAMMING)
OCCURS AFTER AN OPERATING CONDITION IS CHANGED

NORMAL OPERATION

FIG. 9A

SHEET JAMMING

| EXAMPLES OF CHARACTERISTIC AMOUNTS CONSTITUTING A SPACE | |
|---|---|
| WHAT IS USED WHEN AN OPERATING CONDITION IS CHANGED | A SLOPE OF AN APPROXIMATE STRAIGHT LINE OF TIME-SERIES DATA BEFORE THE OPERATING CONDITION IS CHANGED |
| | A VARIANCE OF THE DATA |
| WHAT IS USED EVEN IN MONITORING A CONTINUOUS STATE | CURRENT VALUES OF A ROLLER DRIVING MOTOR |

FIG. 9B

POOR TRANSFER

| EXAMPLES OF CHARACTERISTIC AMOUNTS CONSTITUTING A SPACE | |
|---|---|
| WHAT IS USED WHEN AN OPERATING CONDITION IS CHANGED | AN AVERAGE VALUE OF TIME-SERIES DATA BEFORE THE OPERATING CONDITION IS CHANGED |
| | A VARIANCE OF THE DATA |
| WHAT IS USED EVEN IN MONITORING A CONTINUOUS STATE | TEMPERATURES IN THE APPARATUS |
| | HUMIDITIES IN THE APPARATUS |

FIG. 12

| APPARATUS IDENTIFICATION INFORMATION | EXECUTION DATE AND TIME | OPERATING CONDITION | | | MONITORING ITEM | | |
|---|---|---|---|---|---|---|---|
| | | SHEET TYPE | ONE-SIDE/ DUPLEX | ... | SHEET PASSING TIME | TRANSFER CURRENT | ... |
| #1001 | 2010/1/1 10:00 | NORMAL SHEET | ONE SIDE | ... | $a_1$ SECONDS | $A_1$ mA | ... |
| | 2010/1/1 10:05 | NORMAL SHEET | BOTH SIDES | ... | $a_2$ SECONDS | $A_2$ mA | ... |
| | ... | ... | ... | ... | ... | ... | ... |
| #1002 | 2010/1/3 15:00 | NORMAL SHEET | ONE SIDE | ... | $b_1$ SECONDS | $B_1$ mA | ... |
| | 2010/1/3 15:10 | CARDBOARD | ONE SIDE | ... | $b_2$ SECONDS | $B_2$ mA | ... |
| | ... | ... | ... | ... | ... | ... | ... |

FIG. 13

| APPARATUS IDENTIFICATION INFORMATION | MAINTENANCE DATE AND TIME | CATEGORY | TROUBLE TYPE |
|---|---|---|---|
| #1001 | 2010/1/10 13:00<br>2010/1/22 11:00<br>· · | IMAGE QUALITY<br>SHEET TRANSPORT SYSTEM<br>· · | TROUBLE a<br>TROUBLE o<br>· · |
| #1002 | 2010/1/12 15:00<br>2010/1/25 16:10<br>· · | ELECTRIC SYSTEM<br>IMAGE QUALITY<br>· · | TROUBLE x<br>TROUBLE a<br>· · |
| · · · | | | |

FIG. 14

| TROUBLE TYPE | CASE NO. | APPARATUS IDENTIFICATION INFORMATION | EXECUTION DATE AND TIME (WITHIN THREE DAYS FROM MAINTE- NANCE DATE AND TIME) | OPERATING CONDITION | | ... | MONITORING ITEM | | ... |
|---|---|---|---|---|---|---|---|---|---|
| | | | | SHEET TYPE | ONESIDE/ DUPLEX | | SHEET PASSING TIME | TRANSFER CURRENT | |
| TROUBLE a | 1 | #1001 | 2010/1/10 11:30 | CARDBOARD | ONE SIDE | ... | $a_i$ SECONDS | $A_i$ mA | ... |
| | | | 2010/1/10 11:20 | CARDBOARD | ONE SIDE | ... | $a_{i+1}$ SECONDS | $A_{i+1}$ mA | ... |
| | | | 2010/1/10 11:00 | NORMAL SHEET | ONE SIDE | ... | $a_{i+2}$ SECONDS | $A_{i+2}$ mA | ... |
| | 2 | #1002 | 2010/1/25 12:10 | CARDBOARD | ONE SIDE | ... | $b_j$ SECONDS | $B_j$ mA | ... |
| | | | 2010/1/24 14:30 | CARDBOARD | ONE SIDE | ... | $b_{j+1}$ SECONDS | $B_{j+1}$ mA | ... |
| | | | 2010/1/24 13:40 | NORMAL SHEET | ONE SIDE | ... | $b_{j+2}$ SECONDS | $B_{j+2}$ mA | ... |

| TROUBLE TYPE | CHANGE PATTERN OF OPERATING CONDITION | | | MONITORING ITEM | CHARACTERISTIC AMOUNT ITEM | CHARACTERISTIC AMOUNT | |
|---|---|---|---|---|---|---|---|
| | OPERATING CONDITION | PRE-CHANGE STATE | POST-CHANGE STATE | | | CASE 1 | CASE 2 |
| TROUBLE a | SHEET TYPE ONESIDE/ DUPLEX | NORMAL SHEET ONE SIDE | CARDBOARD ONE SIDE | TRANSFER CURRENT | AVERAGE, VARIANCE | $m_1$ $s_1$ | $m_2$ $s_2$ |
| | | | | HUMIDITY IN APPARATUS | AVERAGE | $x_1$ | $x_2$ |
| | | | | TEMPERATURE IN APPARATUS | AVERAGE | $y_1$ | $y_2$ |
| | ⋅ | ⋅ | ⋅ | ⋅ ⋅ ⋅ | | ⋅ ⋅ ⋅ | ⋅ ⋅ ⋅ |

IMAGE FORMING SYSTEM, PROGNOSIS CRITERION SETTING APPARATUS, PROGNOSIS APPARATUS, IMAGE FORMING APPARATUS AND NON-TRANSITORY COMPUTER-READABLE RECORDING MEDIUM

CROSS-REFERENCE TO RELATED APPLICATIONS

This application is based on and claims priority under 35 USC 119 from Japanese Patent Application No. 2010-271824 filed Dec. 6, 2010.

BACKGROUND

1. Technical Field

The disclosure relates to an image forming system, a prognosis criterion setting apparatus, a prognosis apparatus, an image forming apparatus, a prognosis criterion setting method, a prognosis method, an image forming method and a non-transitory computer-readable recording medium.

2. Related Art

In an image forming apparatus having an image forming function of forming and outputting an image on a recording medium such as a sheet of paper, when a trouble (sheet jamming, poor transfer and the like) obstructing the image forming function occurs, the use of the image forming function is limited, thereby causing an inconvenience to a user. Accordingly, before the trouble occurs or after the trouble occurs, it has been demanded to predict occurrence of a trouble and thus to rapidly take necessary measures such as replacement or repair of a corresponding part, thereby reducing time during which the use of the image forming function is limited.

SUMMARY

According to an aspect of the invention, an image forming system includes a first generation unit, a setting unit, a second generation unit and a prognosis unit. For a monitoring item whose detection values, which are detected during an image forming operation in an image forming apparatus in which a trouble occurred within a predetermined time period after an operating condition of the image forming operation was changed, were changed from a normal state to an abnormal state after the operating condition was changed, the first generation unit generates characteristic information indicating a variation state of the detection values which were detected before the operating condition was changed. The setting unit sets criterion information which is a criterion to predict occurrence of a trouble, based on the characteristic information generated by the first generation unit. The second generation unit generates, for the monitoring item corresponding to the criterion information set by the setting unit, characteristic information indicating a variation state of detection values in an image forming apparatus of a prognosis target. The prognosis unit predicts as to whether or not a trouble occurs in the image forming apparatus of the prognosis target after the operating condition is changed in the image forming apparatus of the prognosis target, based on a difference between the criterion information set by the setting unit and the characteristic information generated by the second generation unit.

BRIEF DESCRIPTION OF THE DRAWINGS

Exemplary embodiments of the invention will be described based on the accompanying drawings, wherein:

FIG. 3 shows attribute values relating to execution commands of an image forming process in the image forming system according to the exemplary embodiment of the invention;

FIG. 6 shows relationships between trouble types and monitoring items in the image forming system according to the exemplary embodiment of the invention;

FIGS. 9A and 9B show characteristic amounts which constitute a criterion abnormal space in the image forming system according to the exemplary embodiment of the invention;

FIG. 12 shows examples of data stored in a monitoring information accumulation section and a maintenance information accumulation section;

FIG. 13 shows examples of data stored in the monitoring information accumulation section and the maintenance information accumulation section;

FIG. 14 shows an example of data stored in a trouble information accumulation section; and FIG. 15 shows an example of data stored in an abnormal space accumulation section.

DESCRIPTION

The exemplary embodiments of the invention will be described with reference to the accompanying drawings.

Figure 1:
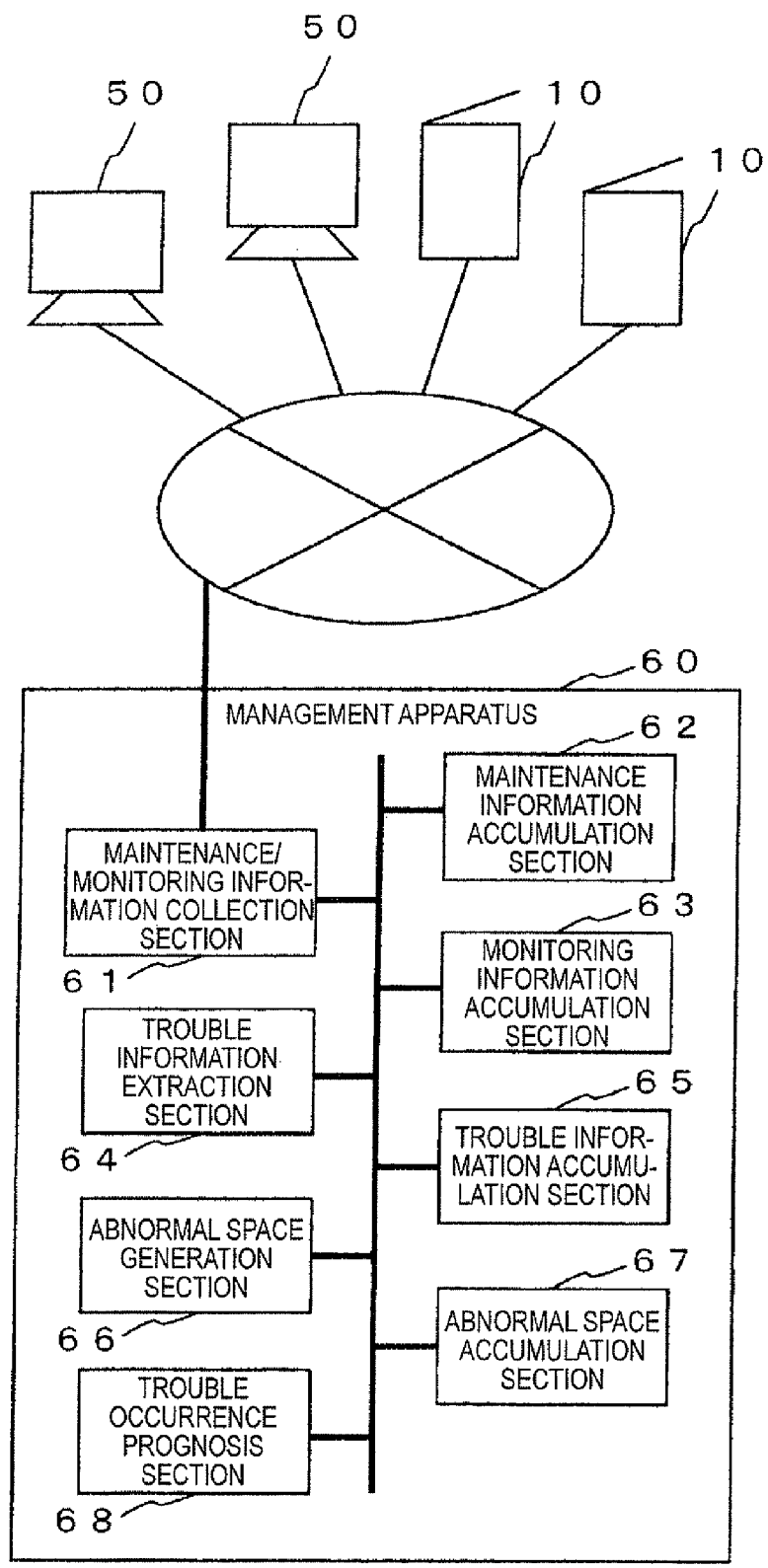
FIG. 1 shows the configuration of an image forming system according to an exemplary embodiment of the invention.

FIG. 1 shows the configuration of an image forming system according to an exemplary embodiment of the invention.

The image forming system of this exemplary embodiment has image forming apparatuses 10 which form images on recording media such as sheets of paper for output and maintenance information input terminals 50 which are used by administrators of the image forming apparatuses 10 and maintenance staffs. In the exemplary embodiment shown in FIG. 1, the two image forming apparatuses 10 and the two maintenance information input terminals 50 are provided. However, the numbers of apparatuses 10 and terminals 50 are not limited thereto but can be arbitrary.

The image forming system of this exemplary embodiment also has a management apparatus 60 which is connected so as to be able to be wired or wireless communicate with the image forming apparatuses 10 and the maintenance information input terminals 50 via a communication network and predicts occurrence of troubles in the image forming apparatuses 10 using information collected from the apparatuses 10 and terminals 50. In the exemplary embodiment of FIG. 1, one management apparatus 60 is provided. However, the management apparatus 60 may be configured so that functional sections 61 to 67 which will be described later may be distributed in plural devices.

The image forming apparatus 10 is an apparatus having an image forming function of forming an image on a recording medium such as a sheet of paper for output. Examples of the image forming apparatus 10 include a printer (printing device), a copier (copying device), a facsimile device, and a multifunctional device having printing, copying and facsimile functions.

An operation of the image forming apparatus 10 will be briefly described with reference to FIG. 2.

Figure 2:
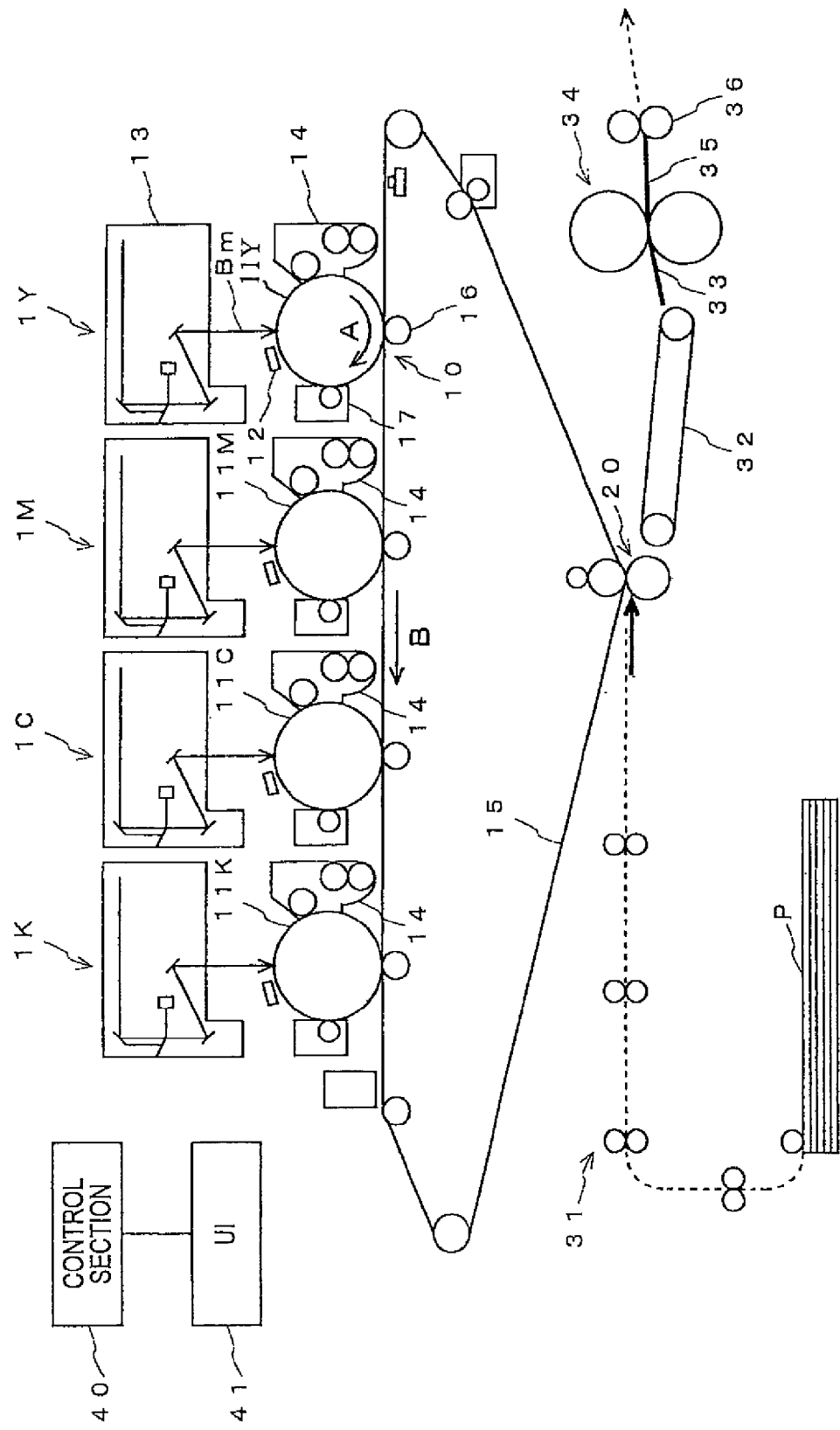
FIG. 2 shows the configuration of an image forming apparatus of the image forming system according to the exemplary embodiment of the invention.

FIG. 2 shows the configuration of an image forming part of the image forming apparatus 10. The image forming apparatus 10 of this exemplary embodiment is an apparatus of an intermediate transfer type, so-called a tandem-type apparatus. As representative functional sections, the image forming apparatus 10 has plural image forming units 1Y, 1M, 1C, 1K, a primary transfer section 10, a secondary transfer section 20, and a fixing device 34. The plural image forming units 1Y, 1M, 1C, 1K form toner images of respective color components by the electrophotography method. The primary transfer section 10 sequentially transfers (primarily transfers) the toner images of the respective color components formed by the respective image forming units 1Y, 1M, 1C, 1K onto an intermediate transfer belt 15. The secondary transfer section 20 collectively transfers (secondarily transfers) the overlapped toner images, which have been transferred onto the intermediate transfer belt 15, onto a sheet of paper P (which is an example of a recording medium). The fixing device 34 fixes the secondarily transferred images on the sheet of paper P.

Also, the image forming apparatus 10 of this exemplary embodiment has a control section 40 which controls operations of the respective sections/units and a user interface (UI) 41 which presents information to a user and receives an instruction from the user.

In this exemplary embodiment, the image forming units 1Y, 1M, 1C, 1K have photosensitive drums 11 (11Y, 11M, 11C, 11K) which rotate in an arrow A direction, respectively. Also, various devices for electrophotography are sequentially arranged around the respective photosensitive drums 11, such as a charging device 12, an exposure device 13, a developing device 14, a primary transfer roll 16 and a drum cleaner 17. The charging device 12 charges the photosensitive drum 11. The exposure device 13 irradiates an exposing beam Bm onto the photosensitive drum 11 to write an electrostatic latent image. The developing device 14 stores toner of each color component therein and visualizes the electrostatic latent image on the photosensitive drum 11 with the toner. The primary transfer roll 16 transfers a toner image of each color component, which has been formed on the photosensitive drum 11, onto the intermediate transfer belt 15 in the primary transfer section 10. The drum cleaner 17 removes a remaining toner on the photosensitive drum 11.

The image forming units 1Y, 1M, 1C, 1K are arranged along a substantially straight line in order of yellow (Y), magenta (M), cyan (C) and black (K) from an upstream side of the intermediate transfer belt 15 and are configured so that they can detachably contact with the intermediate transfer belt 15.

Also, the image forming apparatus 10 has, as a sheet transport system, a sheet feeding mechanism section 31, a transport belt 32, a fixing entrance guide 33, a sheet discharge guide 35, and sheet discharge rolls 36. The sheet feeding mechanism section 31 performs a sheet feeding operation of picking out a sheet P from a sheet storage section and transporting the sheet P to the secondary transfer section 20. The transport belt 32 transports the sheet P having passed the secondary transfer section 20 toward the fixing device 34. The fixing entrance guide 33 guides the sheet P to an entrance of the fixing device 34. The sheet discharge guide 35 guides the sheet P discharged from the fixing device 34. The sheet discharge rolls 36 discharge the sheet P guided by the sheet discharge guide 35 to an outside of the image forming apparatus 10.

In other words, the toner image on the intermediate transfer belt 15 is electrostatically transferred by the secondary transfer section 20 onto the sheet P, which is fed from the sheet storage section to the secondary transfer section 20 by the sheet feeding mechanism section 31. Then, the sheet P is transported to the transport belt 32 while being peeled off from the intermediate transfer belt 15. Then, the sheet is transported to the fixing device 34 through the fixing entrance guide 33 in accordance with an operating speed of the fixing device 34. The non-fixed toner image on the sheet P transported to the fixing device 34 is subject to a fixing process in which the fixing device 34 applies heat and pressure to the sheet P, so that it is fixed on the sheet P. After that, the sheet P having the fixed image formed thereon is transported to a discharged sheet storage section (not shown) which is arranged at the outside of the apparatus, through the sheet discharge guide 35 and the sheet discharge rolls 36.

The image forming apparatus 10 of this exemplary embodiment has various monitoring items which are set in advance as items capable of contributing to prognosis of occurrence of a trouble and is configured to detect values of the respective monitoring items during the image forming operation by sensors provided in respective sections/units relating to the image formation, on an as-needed basis.

Examples of the monitoring items may include a potential of a photosensitive member (potential of the photosensitive drum 11), a charge current of the photosensitive member (charge current of the photosensitive drum 11), an amount of semiconductor laser light (an amount of laser light of the exposure device 13), a density of the developing device (density of a toner image formed by the developing device 14), a primary transfer current (transfer current of the primary transfer section 10), a secondary transfer current (transfer current of the secondary transfer section 20), a temperature of a fixing device heating roll (temperature of a heating roll which heats the fixing device 34), and a process control patch density (density of a patch image which is used for process control such as positioning of the toner image and density control of the toner image). In this exemplary embodiment, values which are measured at parts corresponding to the monitoring items are used as detection values of the monitoring items. However, other values such as target values for controlling the respective parts and difference values between the measured values and the target values may be used. Also, environment information such as temperature and humidity in the apparatus may be added to the monitoring items.

When the image forming apparatus 10 of this exemplary embodiment receives a command to execute the image forming process for one or more pages, values of the respective monitoring items are detected whenever respective images to be output are formed on a sheet P and output in accordance with an operating condition, such as sheet size, designated in the execution command (i.e., for each of pages). When all image forming process regarding the execution command is completed, a statistical process is executed for the monitoring items to obtain statistical values (average values, standard deviations and the like) and monitoring information including the detection values (statistical values) of the respective monitoring items is transmitted to the management apparatus 60.

In this exemplary embodiment, the monitoring information, which is transmitted to the management apparatus 60 every execution command of the image forming process, includes data containing execution date and time indicating date and time at which the execution command was received (or date and time at which the image forming process relating to the execution command is completed), an operating condition relating to the execution command, and apparatus identification information identifying the image forming apparatus itself as well as the detection values (statistical values) of the respective monitoring items.

Examples of the execution command for the image forming process include a print command to visualize and output electronic data (document data, Web contents and the like) on a sheet P, a copying command to image-scan a paper document and output an image of the document on a sheet P, and a facsimile output command to form an image which is received by facsimile communication, on the sheet P.

Also, examples of the operating condition relating to the execution command for the image forming process include, as shown in FIG. 3, a "sheet type" which designates a type of a sheet P (a normal sheet, a coated sheet, a cardboard, a color sheet and the like), a "one-side/duplex mode" which designates as to whether an image is output on one side or both sides of a sheet P, a "color mode" which designates as to whether an image is output in black/white or color, and a "sheet size" which designates a size of a sheet P (A3, A4, A5, B4, B5 and the like).

The image forming apparatus 10 of this exemplary embodiment switches among the sheet storage sections, which are feeder sources of the sheets P, in accordance with a change of the "sheet type" and/or "sheet size"; switches whether or not the sheet P is inverted, in accordance with a change of the "one side/duplex mode"; and switches whether or not the image forming units (1Y, 1M, 1C) other than the black (K) are used, in accordance with a change of the "color mode", and changes contents of the image forming operation as the operating condition relating to the execution command of the image forming process is changed.

Instead of the above configuration in which the monitoring information is transmitted to the management apparatus 60 whenever the image forming process based on the execution command is completed, such a configuration may be adopted that monitoring information, which is obtained whenever the image forming process based on the execution command is completed, is stored in a memory and the stored monitoring information, which have not yet been transmitted, are transmitted when a predetermined transmitting condition is satisfied. Specifically, the monitoring information may be transmitted when the operating condition is changed (when an execution command requiring an operating condition, which is different from an operating condition relating to the latest execution command, is received and executed); when a predetermined time period elapses (for example, every 10 minutes); or in response to a request from the management apparatus 60.

Next, the maintenance information input terminal 50 will be described.

The maintenance information input terminal 50 receives maintenance information from a maintenance staff who visited an installation place of the image forming apparatus 10 and actually performed a maintenance operation and/or a person who received a report about the maintenance operation, and transmits the maintenance information to the management apparatus 60. Also, the maintenance information input terminal 50 of this exemplary embodiment receives information about a prognosis result regarding occurrence of a trouble in the image forming apparatus 10 from the management apparatus 60 and displays it on a display device provided in the image forming apparatus 10.

The maintenance information, which is transmitted to the management apparatus 60, includes data in which maintenance date and time indicating date and time at which the maintenance operation was performed, a trouble type indicating a trouble which was solved by the maintenance operation, apparatus identification information identifying the image forming apparatus 10 for which the maintenance operation is performed, and the like are contained. In this exemplary embodiment, various troubles are classified into trouble types depending on their contents, and the maintenance staffs select and input a corresponding trouble type.

Next, the management apparatus 60 will be described.

The management apparatus 60 of this exemplary embodiment is an apparatus that predicts occurrence of a trouble in the image forming apparatus 10, and has a maintenance/monitoring information collection section 61, a maintenance information accumulation section 62, a monitoring information accumulation section 63, a trouble information extraction section 64, a trouble information accumulation section 65, an abnormal space generation section 66, an abnormal space accumulation section 67 and a trouble occurrence prognosis section 68.

The maintenance/monitoring information collection section 61 collects (receives) the monitoring information transmitted from the image forming apparatus 10 and stores it in the monitoring information accumulation section 63. Also, the maintenance/monitoring information collection section 61 collects (receives) the maintenance information transmitted from the maintenance information input terminal 50 and stores it in the maintenance information accumulation section 62.

As described above, the monitoring information, which is accumulated (stored) in the monitoring information accumulation section 63, includes the apparatus identification information identifying the image forming apparatus 10, the execution date and time at which the execution command of the image forming process was received by the image forming apparatus 10 (or date and time at which the image forming process relating to the execution command was completed), the operating condition relating to the execution command, and the detection values of the respective monitoring items when the image forming process relating to the execution command was performed. Also, the maintenance information, which is accumulated (stored) in the maintenance information accumulation section 62, includes the apparatus identification information identifying the image forming apparatus 10, maintenance date and time at which the maintenance operation was performed for the image forming apparatus 10, and the trouble type, which was solved in the image forming apparatus 10 by the maintenance operation. FIGS. 12 and 13 show examples of data stored in the monitoring information accumulation section 63 and the maintenance information accumulation section 62.

The trouble information extraction section 64 extracts trouble information for each trouble, based on the maintenance information accumulated in the maintenance information accumulation section 62 and the monitoring information accumulated in the monitoring information accumulation section 63, and stores it in the trouble information accumulation section 65.

Specifically, in this exemplary embodiment, it is assumed that the date and time at which the maintenance operation was performed is regarded as the date and time at which a trouble occurred. For each trouble occurrence case (for each maintenance information), the trouble information extraction section 64 extracts, as the trouble information for the image forming apparatus 10 in which the trouble occurred, the execution date and time, operating conditions and detection values of the monitoring items of the respective execution commands during a predetermined time period (three days in this exemplary embodiment) before the occurrence of the trouble in the image forming apparatus 10, and stores the extracted trouble information in the trouble information accumulation section 65 in association with the corresponding trouble type (trouble type contained in the maintenance information). In other words, based on the maintenance information accumulated in the maintenance information accumulation section 62, the trouble information extraction section 64 specifies the monitoring information containing (i) the same apparatus identification information as the apparatus identification information contained in the maintenance information and (ii) the execution date and time within the past three days from the maintenance date and time contained in the maintenance information. Then, the trouble information extraction section 64 extracts the execution date and time, the operating conditions, the detection values of the respective monitoring items contained in the specified monitoring information and stores them in the trouble information accumulation section 65. FIG. 14 shows an example of data stored in the trouble information accumulation section 65. In this exemplary embodiment, the extraction process is performed while the date and time at which the maintenance operation was performed is regarded as the date and time at which a trouble occurred. However, when the image forming apparatus 10 has a configuration capable of specifying the date and time at which a trouble occurred, such as a configuration having a trouble detection function, the extraction process may be performed using the date and time at which a trouble actually occurred.

The trouble information accumulation section 65 accumulates (stores) the trouble information of the respective trouble occurrence cases, which are extracted by the trouble information extraction section 64, and their trouble types in association with each other. The trouble information contains, for each of the execution commands of the image forming process during the predetermined time period before the trouble occurred, the execution date and time of the execution command, the operating conditions relating to the execution command, and the detection values of the respective monitoring items when the image forming process relating to the execution command was performed.

The abnormal space generation section 66 specifies, for each trouble type, a monitoring item(s) which are inferred to have a causal relationship with occurrence of the trouble, based on the trouble information and the trouble types, which are accumulated in the trouble information accumulation section 65, generates a criterion abnormal space (an example of criterion information which is used as a criterion for predicting occurrence of a trouble) for the specified monitoring item(s), and stores the generated criterion abnormal space in the abnormal space accumulation section 67. FIG. 15 shows an example of data stored in the abnormal space accumulation section 67.

Figure 4:
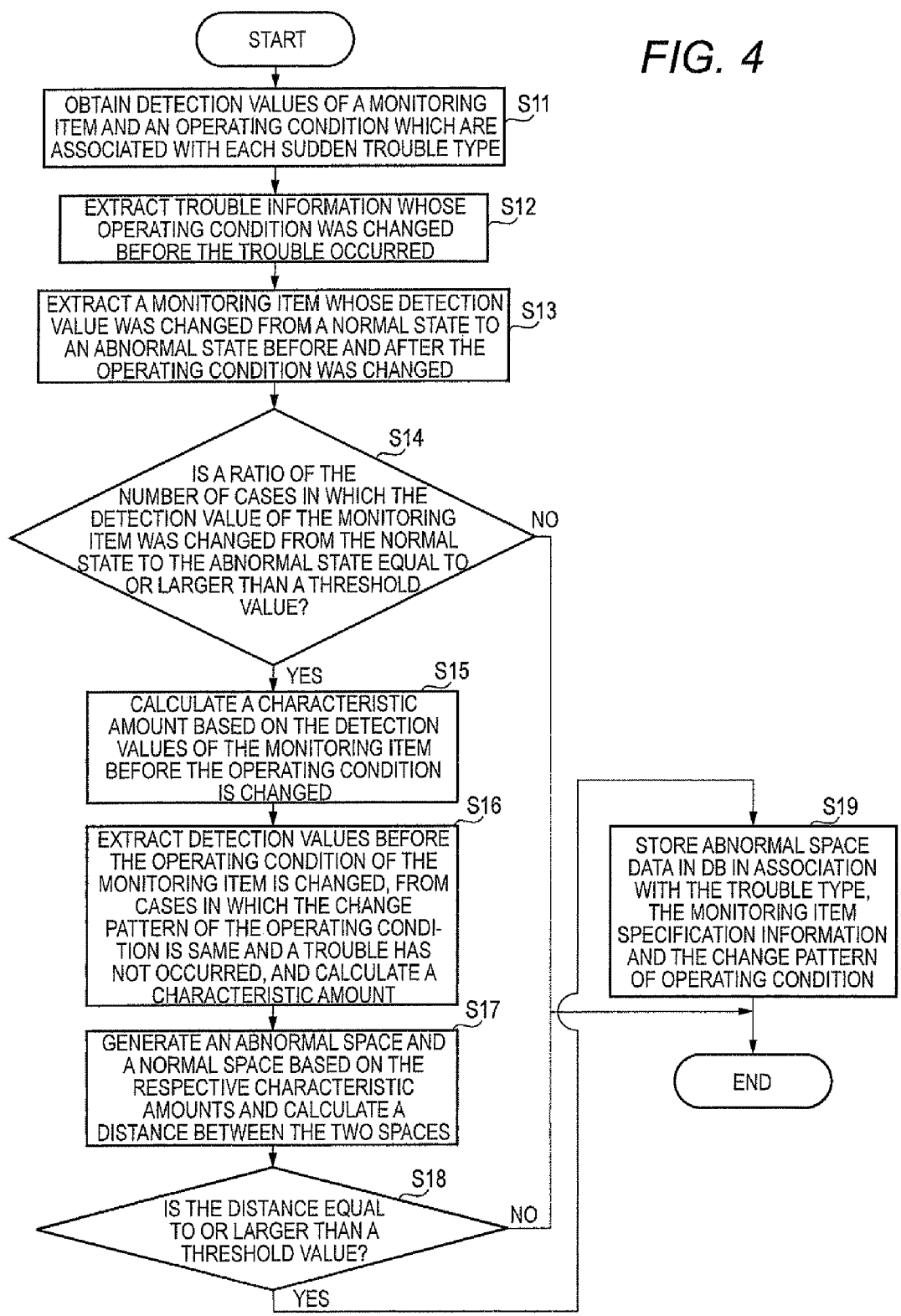
FIG. 4 is a flowchart relating to setting of a prognosis criterion in the image forming system according to the exemplary embodiment of the invention.

An operation of the abnormal space generation section 66 will be described with reference to a flowchart, shown in FIG. 4, relating to setting of a prognosis criterion. The flowchart of FIG. 4 is repeated in accordance with the number of trouble types.

First, with regard to a trouble type which is to be processed (target trouble type), among the trouble information (trouble occurrence cases) with which the target trouble type is associated with, the abnormal space generation section 66 extracts trouble information containing the execution command of the image forming process whose operation condition was changed before the trouble occurred (steps S11, S12). The abnormal space generation section 66 specifies monitoring item(s) which are contained in the extracted trouble information and whose detection value was changed from normal to abnormal after the operating condition was changed (step S13). In this exemplary embodiment, for each monitoring item, a range of detection value (upper and lower limits) within which the image forming operation can be normally performed without any trouble is defined as a normal range. When a detection value is within the normal range, the detection value is determined to be normal. Otherwise, the detection value is determined to be abnormal.

Next, with regard to the monitoring items, which are specified for each trouble occurrence case in step S13, the abnormal space generation section 66 extracts a monitoring item having a ratio of the number of cases in which the detection value was changed from normal to abnormal after the operating condition was changed (a ratio to the total number of trouble occurrence cases which are common in trouble type and in change pattern of the operating condition) equal to or larger than a threshold value (step S14).

If no monitoring item is extracted in step S14, the abnormal space generation section 66 proceeds to a process for a next trouble type. On the other hand, if one or more monitoring items are extracted, the abnormal space generation section 66 executes the following processes (steps S15 to S19).

First, the abnormal space generation section 66 specifies cases (1) in which the operating condition was changed and the change matches the change pattern and (2) in which a trouble of the target trouble type occurred within a predetermined time period after the change (in this exemplary embodiment, within one day after the operating condition is changed). The "change pattern of the operating condition" indicates a correspondence relationship between an operating condition before the change and an operating condition after the change.

Then, for each specified case, the abnormal space generation section 66 calculates a characteristic amount of the detection values of each specified monitoring item which were detected before the operating condition was changed (in this exemplary embodiment, for three days before the operating condition is changed) in the image forming apparatus 10 related to the specified example (step S15).

Also, the abnormal space generation section 66 specifies cases (1) in which the operating condition was changed and the change matches the change pattern and (2) in which a trouble has not occurred within a predetermined time period after the change (in this exemplary embodiment, within one day after the operating condition is changed). Then, for each specified example and for each monitoring item, the abnormal space generation section 66 calculates a characteristic amount of the detection values of each specified monitoring item which were detected before the operating condition was changed (in this exemplary embodiment, for three days before the operating condition is changed) in the image forming apparatus 10 related to the specified example (step S16).

The characteristic amount of each monitoring item before the operating condition was changed may be various values; for example, it may be variation states of the detection values before the change of the operating condition, such as average or variance of the detection values during the period, a slope of an approximate curve indicating time-series transition and the like. Also, plural kinds of characteristic amounts (for example, an average and a variance) may be calculated for one monitoring item.

Also, examples of the predetermined time period after the operating condition was changed, time periods determined by other determination criteria such as a period during which images are formed for a predetermined number of pages, a period during which a sheet is transported for a predetermined distance and the like, as well as the period specified by a time length (one day in this exemplary embodiment). Likewise, examples of the time period before the change of the operating condition for which the characteristic amount is calculated for each monitoring item includes periods specified by other determination criteria as well as the period specified by a time length (three days in this exemplary embodiment).

Then, based on the characteristic amounts of the respective monitoring items calculated in step S15 for the respective cases in which the troubles occurred, the abnormal space generation section 66 generates, for each case, a characteristic vector (characteristic amount group) having the characteristic amounts of the respective monitoring items as elements and generates a vector space (a set of the characteristic amount groups) constituted by the characteristic vectors of the respective cases, as an abnormal space. Also, based on the characteristic amounts of the respective monitoring items calculated in step S16 for each case in which the trouble has not occurred, the abnormal space generation section 66 generates, for each case, a characteristic vector (characteristic amount group) having the characteristic amounts of the respective monitoring items as elements and generates a vector space (a set of the characteristic amount groups) constituted by the characteristic vectors of the respective cases, as a nounal space. Then, the abnormal space generation section 66 calculates a distance (Mahalanobis' distance in this exemplary embodiment) indicating a deviation degree (difference) between the normal and abnormal spaces (step S17) and compares the calculated distance with a first threshold value which is set in advance (step S18).

As a result of the comparison in step S18, if it is determined that the distance calculated in step S17 is equal to or larger than the first threshold value, the abnormal space generation section 66 sets the abnormal space, which is generated in step S17, as the criterion abnormal space and stores the criterion abnormal space in the abnormal space accumulation section 67 in association with the corresponding trouble type, the change pattern of the operating condition and the monitoring item specification information indicating the respective monitoring items relating to the criterion abnormal space (step S19).

As the result of the comparison in step S18, if it is not determined that the distance calculated in step S17 is equal to or larger than the first threshold value or after the process of step S19 is performed, the abnormal space generation section 66 proceeds to a process for a next trouble type.

The trouble occurrence prognosis section 68 predicts occurrence of a trouble in the image forming apparatus 10 which is a prognosis target, based on the criterion abnormal spaces, which are stored in the abnormal space accumulation section 67 for the respective trouble types and for respective change patterns of the operating conditions.

Figure 5:
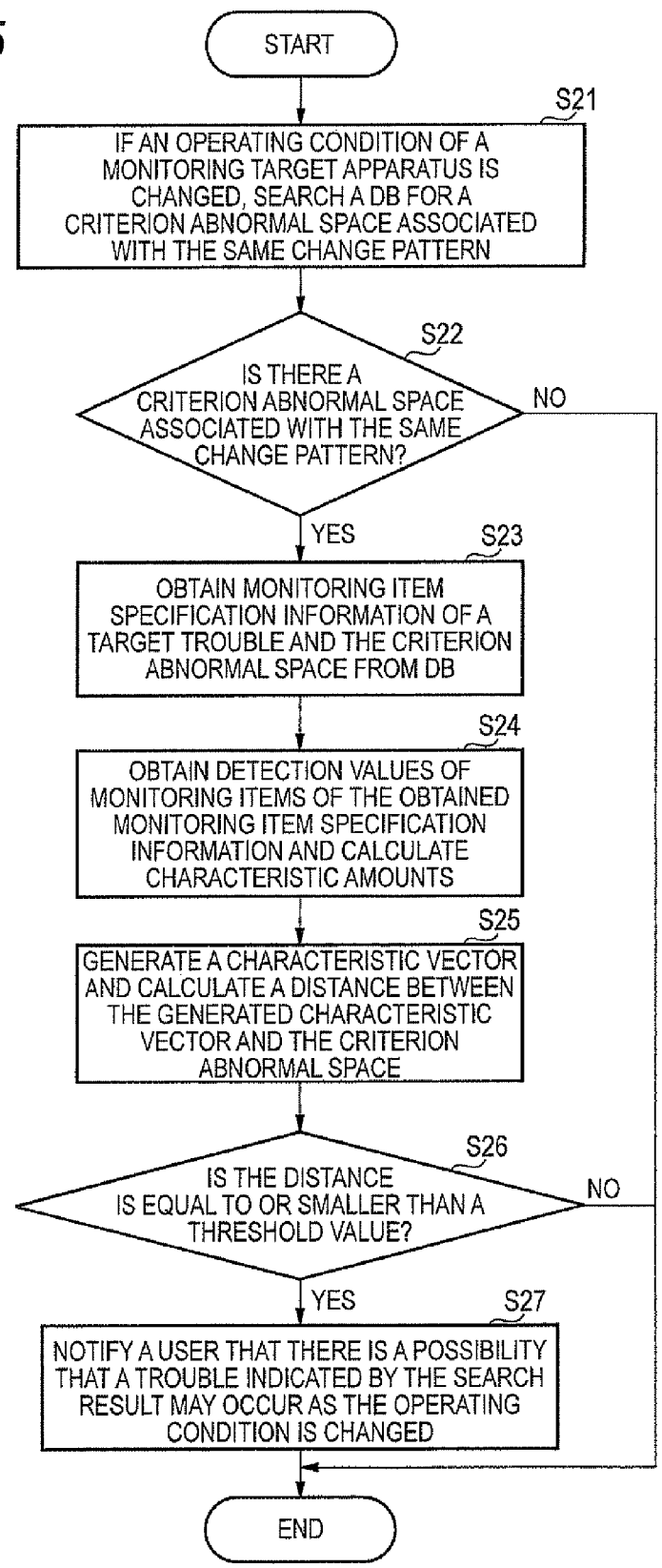
FIG. 5 is a flowchart relating to prognosis of occurrence of a trouble in the image forming system according to the exemplary embodiment of the invention.

An operation of the trouble occurrence prognosis section 68 will be described with reference to a flowchart, shown in FIG. 5, relating to prognosis of occurrence of a trouble.

In this exemplary embodiment, the trouble occurrence prognosis section 68 monitors a collection status of the monitoring information by the maintenance/monitoring information collection section 61 (or an accumulation status of the monitoring information by the monitoring information accumulation section 63). If the trouble occurrence prognosis section 68 detects, based on the monitoring information collected for the image forming apparatus 10 (prognosis target) that the operating condition is changed in the image forming apparatus 10 (prognosis target), it searches the abnormal space accumulation section 67 for the criterion abnormal space with which the detected change pattern of the operating condition is associated (step S21).

As a result of the search in step S21, if there is no associated criterion abnormal space, the trouble occurrence prognosis section 68 ends the process ("no" decision, step S22). On the other hand ("yes" decision, step S22), if there is an associated criterion abnormal space, the trouble occurrence prognosis section 68 executes the following processes (steps S23 to S27).

First, the trouble occurrence prognosis section 68 obtains the criterion abnormal space and the monitoring item specification information from the abnormal space accumulation section 67 (step S23).

Next, the trouble occurrence prognosis section 68 calculates, for each monitoring items specified by the monitoring item specification information obtained in step S23, a characteristic amount of the detection values, which were detected in the image forming apparatus 10 before the operating condition was changed (prognosis target), by the same method used in generating the criterion abnormal space (step S24).

Then, the trouble occurrence prognosis section 68 generates a characteristic vector (characteristic amount group) having the characteristic amounts of the respective monitoring items as its elements, based on the characteristic amounts for the respective monitoring items calculated in step S24, calculates a distance (Mahalanobis' distance in this exemplary embodiment) indicating a deviation degree (difference) between the generated characteristic vector and the obtained criterion abnormal space (step S25), and compares the calculated distance with a second threshold value which is set in advance (step S26).

As a result of the comparison in step S26, if it is determined that the distance calculated in step S25 is equal to or smaller than the second threshold value, the trouble occurrence prognosis section 68 predicts that a trouble of the trouble type associated with the obtained criterion abnormal space will occur in the image forming apparatus 10 (prognosis target), and transmits information indicating the prognosis result to the maintenance information input terminal 50 so as to notify the prognosis result to the maintenance staff and/or administrator of the image forming apparatus 10 (prognosis target) (step S27). The trouble occurrence prognosis section 68 may be also configured to transmit the information indicating the prognosis result to the image forming apparatus 10 (prognosis target) so as to notify it to a user of the image forming apparatus 10.

The trouble occurrence prognosis section 68 of this exemplary embodiment also as a function of performing another prognosis (for example, prognosis based on a change tendency of the detection values of the respective monitoring items and/or extraction of a changing point) as well as the prognosis of the trouble occurrence accompanied with the change of the operation condition. However, descriptions thereof will be omitted in the specification.

As described above, the management apparatus 60 of this exemplary embodiment serves as the prognosis criterion setting apparatus that specifies, based on past cases in which troubles occurred as operating condition(s) were changed, monitoring item(s) which were inferred to have a causal relationship with a trouble, generates an abnormal space for the specified monitoring item(s) based on characteristic amounts indicating variation states of detection values which were detected before the operating condition was changed in the image forming apparatus 10 in which the trouble occurred as the operating condition was changed, and sets the generated abnormal space as a criterion abnormal space which is a criterion for predicting the trouble occurrence. The management apparatus 60 also serves as the prognosis apparatus that, as the operating condition is changed in the image forming apparatus 10 of the prognosis target in the same manner as a change pattern of the operating condition relating to the criterion abnormal space, calculates the characteristic amount indicating a variation state of the detection values in the image forming apparatus 10 of the prognosis target, which were detected before the operating condition was changed, and predicts a trouble occurrence relating to the criterion abnormal space when a distance between the characteristic vector having the characteristic amount as its element and the criterion abnormal space satisfies a criterion.

In this exemplary embodiment, the image forming apparatus 10 relating to the generation of the criterion abnormal space and the image forming apparatus 10 of the prognosis target may be the same apparatus or different apparatuses. In other words, the criterion abnormal space may be set based on the detection values of the respective monitoring items, which were detected in one or more image forming apparatuses 10 (which may include the image forming apparatus 10 of the prognosis target), and then the criterion abnormal space is used to predict the trouble occurrence in the image forming apparatus 10 of the prognosis target.

The management apparatus 60 of this exemplary embodiment specifies the monitoring item(s) for each trouble type and each change pattern of the operating condition and sets the criterion abnormal space. However, the invention is not limited thereto.

For example, as illustrated in FIG. 6 showing relationships between the trouble types and the monitoring items, the trouble types may be classified into plural categories, and criterion abnormal spaces of the respective trouble types belonging to the same category may be set using common monitoring items. In the example of FIG. 6, a "parameter 1", a "parameter 2" and the like are set as monitoring items common to a "trouble a", a "trouble b" and the like, which are trouble types belonging to a category of "image quality". The "parameter 1", a "parameter 3" and the like are set as monitoring items common to a "trouble o", a "trouble p" and the like, which are trouble types belonging to a category of "sheet transport system". A "parameter 5", a "parameter 6" and the like are set as monitoring items common to a "trouble x", a "trouble y" and the like, which are trouble types belonging to a category of "electric system."

Next, the specifying of the monitoring item inferred to have a causal relationship with a trouble accompanied with the change of the operating condition will be described with reference to FIGS. 7A, 7B, 8A and 8B.

Figure 7A:
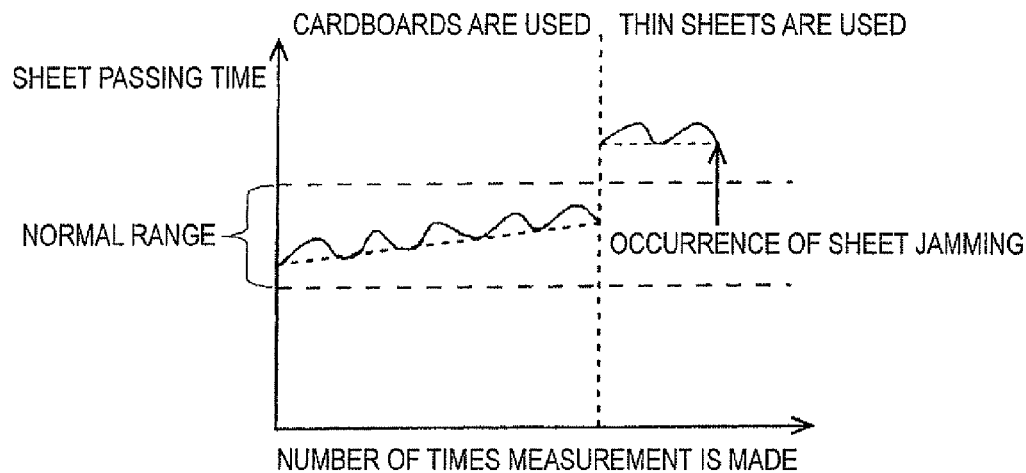
FIGS. 7A and 7B show transition examples of data of a monitoring item (sheet passing time) in the image forming system according to the exemplary embodiment of the invention.
Figure 7B:
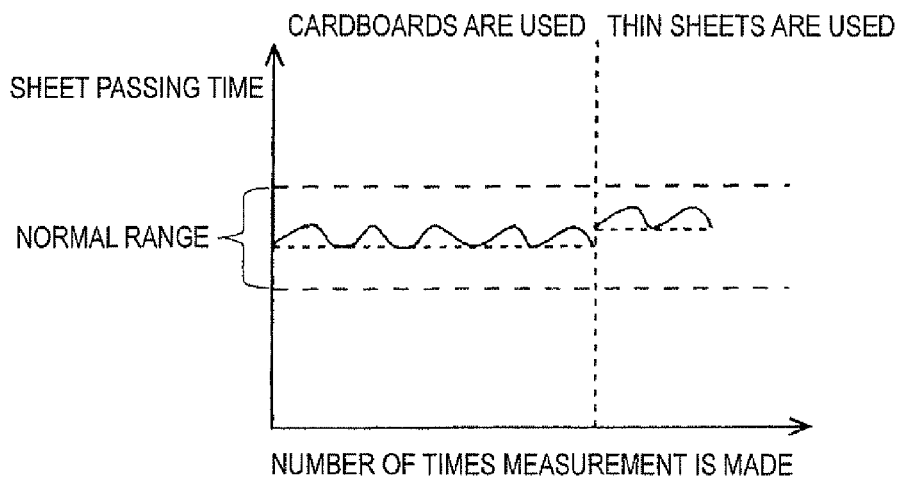

FIG. 7A shows an example of a change of measured values (detection values) of a sheet passing time (an example of the monitoring item) when a trouble of sheet jamming occurred as an operating condition is changed from cardboards to thin sheets. FIG. 7B shows an example of a change of measured values of a sheet passing time when the same change of the operating condition is made but a trouble has not occurred. In FIGS. 7A and 713, a horizontal axis indicates the number of times the sheet passing time is measured (i.e., elapsed time) and a vertical axis indicates measured values (detection values) of the sheet passing time. It seems that as the operating condition is changed, a discontinuity is caused in the continuous change of the measured values, and the values are greatly changed seemingly. According to a method of determining a state change based on time change data, in the case shown in FIG. 7B, it may be determined that a trouble occurs.

As shown in FIGS. 7A and 7B, the case where a trouble has occurred as the operating condition is changed and the case where a trouble has not occurred as the operating condition is changed are clearly different from each other in slope of an approximate straight line (the slope is an example of the characteristic amount) indicating the change of the sheet passing time before the operating condition is changed.

Thus, in this exemplary embodiment, as shown in FIG. 9A, when the operating condition is changed from cardboards to thin sheets, the criterion abnormal space, which is a criterion for predicting occurrence of a sheet jamming trouble is generated based on a slope (and variance of the slope data) of an approximate straight line indicating the change of the sheet passing time before the operating condition is changed. FIG. 9A also shows that when the operating condition is not changed, the criterion abnormal space, which is the criterion for predicting the occurrence of the sheet jamming trouble, is generated based on current values of a motor to drive the transport roller provided in the sheet transport system.

Figure 8A:
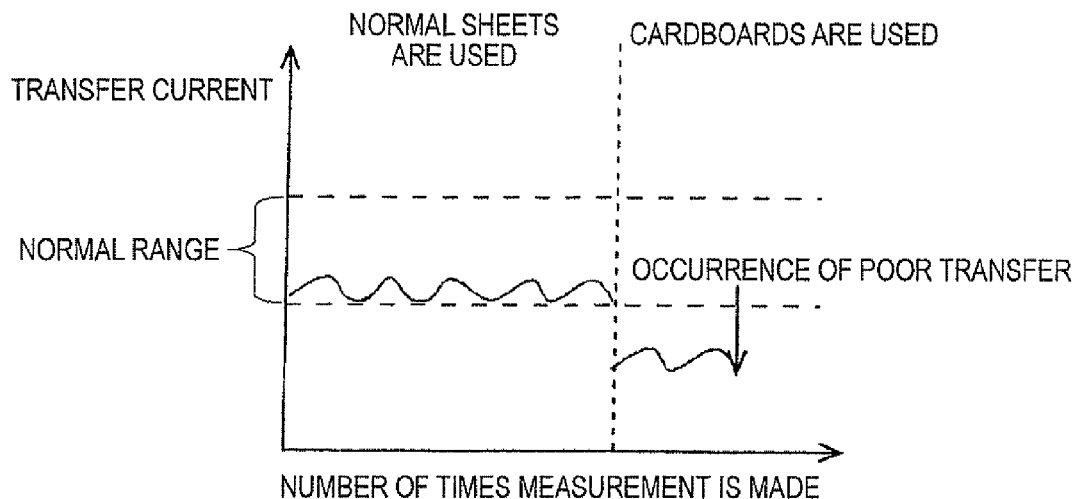
FIGS. 8A and 8B show transition examples of data of a monitoring item (transfer current) in the image forming system according to the exemplary embodiment of the invention.
Figure 8B:
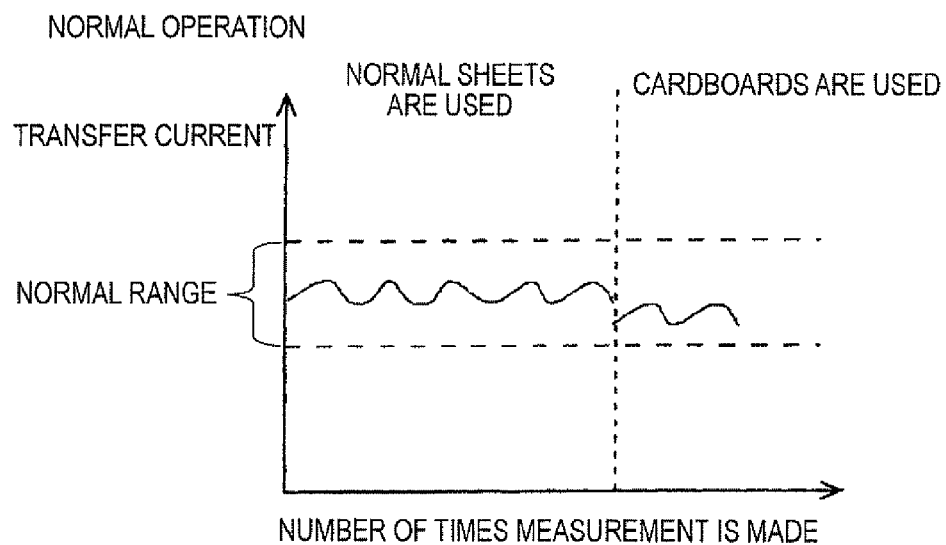

Also, FIG. 8A shows an example of a change of measured values (detection values) of a transfer current (which is an example of the monitoring item) when a trouble of poor transfer has occurred as an operating condition is changed from normal sheets to cardboards. FIG. 8B shows an example of a change of the measured values of the transfer current when the same change of the operating condition is made but a trouble has not occurred. In FIGS. 8A and 88, a horizontal axis indicates the number of times the transfer current is measured (i.e., elapsed time) and a vertical axis indicates measured values (detection values) of the transfer current.

As shown in FIGS. 8A and 8B, the case where a trouble has occurred as the operating condition is changed and the case where a trouble has not occurred as the operating condition is changed are clearly different from each other in average value of the transfer current before the operating condition is changed (the average value is an example of the characteristic amount).

Thus, as shown in FIG. 9B, when the operating condition is changed from normal sheets to cardboards, the criterion abnormal space, which is a criterion for predicting occurrence of the poor transfer trouble is generated based on the average value of the transfer currents (and variance of the transfer currents) before the operating condition is changed. FIG. 9B also shows that when the operating condition is not changed, the criterion abnormal space, which is the criterion for predicting the occurrence of the poor transfer trouble is generated based on humidity and temperature in the image forming apparatus 10.

The management apparatus 60 of this exemplary embodiment is configured that, when the operating condition is changed in the image forming apparatus 10 of the prognosis target, a trouble which is predicted to occur after the operating condition is changed is specified. However, the management apparatus 60 may specify a trouble which is predicted to occur as the operating condition is changed, before the operating condition is changed in the image forming apparatus 10 of the prognosis target.

In other words, for example, for monitoring item(s) relating to a criterion abnormal space corresponding to a change pattern which can occur in a current operating state in the image forming apparatus 10 of the prognosis target, the management apparatus 60 calculates a characteristic amount indicating a variation state of detection values which were detected the most recently in the image forming apparatus 10 of the prognosis target. If a distance between the characteristic vector having the calculated characteristic amount as its element and the criterion abnormal space corresponding to the change pattern, which can occur at the current operating state in the image forming apparatus 10 of the prognosis target satisfies a criterion, the management apparatus 60 may predict that a trouble relating to the criterion abnormal space will occur.

Also, in this exemplary embodiment, the configuration has been described that the operating condition can be switched in units of the execution command of the image forming process. However, such a configuration may be adopted that the operating condition is switched during the execution command, such as the case where the operating condition is designated for each page in the execution command of the image forming process of plural pages.

Figure 10:
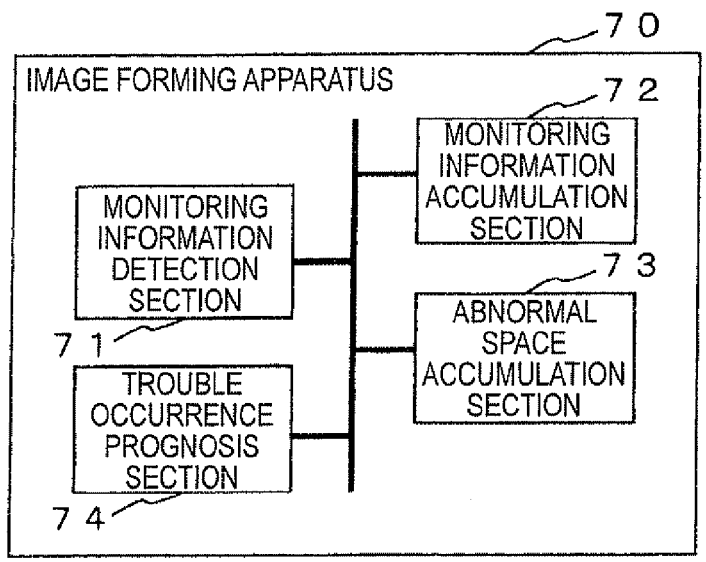
FIG. 10 shows the configuration of an image forming apparatus of an image forming system according to another exemplary embodiment of the invention.

Next, another configuration in which the image forming apparatus 10 itself predicts a trouble occurrence will be described with reference to FIG. 10.

An image forming apparatus 70 shown in FIG. 10 has a monitoring infatuation detection section 71, a monitoring information accumulation section 72, an abnormal space accumulation section 73 and a trouble occurrence prognosis section 74, as well as the respective sections relating to the image forming operation, which have already been described with reference to FIG. 2. The monitoring information detection section 71 detects values of various monitoring items relating to the image formation during an image forming operation. The monitoring information accumulation section 72 accumulates monitoring information having recorded the detection values of the respective monitoring items detected by the monitoring information detection section 71. The abnormal space accumulation section 73 receives and accumulates information of a criterion abnormal space from the management apparatus 60. The trouble occurrence prognosis section 74 predicts occurrence of a trouble in the image forming apparatus 70 itself based on the information accumulated in the monitoring information accumulation section 72 and the abnormal space accumulation section 73.

As the same change of an operating condition as a change pattern of the operating condition relating to the criterion abnormal space stored in the abnormal space accumulation section 73 is made in the image forming apparatus 70 itself, the trouble occurrence prognosis section 74 calculates a characteristic amount indicating a variation state of the detection values before the operating condition is changed. If a distance between the characteristic vector having the calculated characteristic amount as its element and the criterion abnormal space is small enough to satisfy a criterion, the trouble occurrence prognosis section 74 predicts occurrence of a trouble relating to the criterion abnormal space. The prognosis result may be notified to a user of the image forming apparatus 70 or may be transmitted to the maintenance information input terminal 50, which is then notified to a maintenance staff and/or an administrator.

Instead of the configuration in which when an operating condition is changed in the image forming apparatus 70 itself, a trouble which is predicted to occur after the operating condition is changed is specified, the image forming apparatus 70 itself may specify a trouble which is predicted to occur as the operating condition is changed, before the operating condition is changed.

Figure 11:
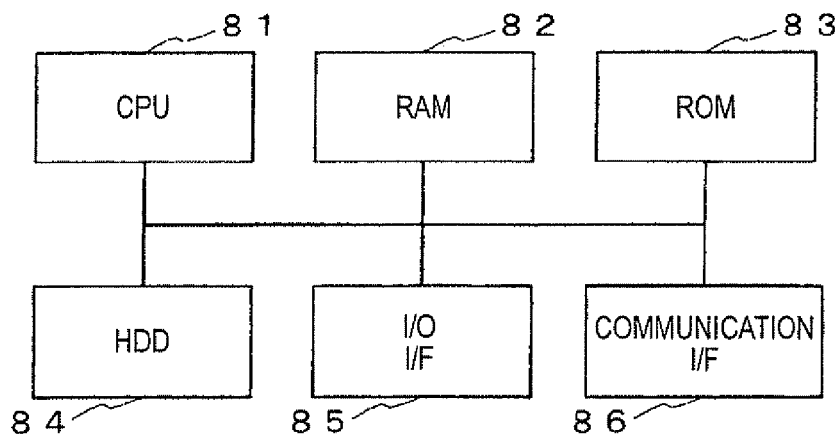
FIG. 11 exemplifies the hardware configuration of a computer that operates as a management apparatus in the image forming system according to the exemplary embodiments of the invention.

FIG. 11 shows the hardware configuration of a computer which operates as the management apparatus 60 in the image forming system of this exemplary embodiment.

In this exemplary embodiment, a computer is configured by various hardware resources such as CPU (Central Processing Unit) 81 that performs a variety of operation processes, a main storage device such as a RAM (Random Access Memory) 82 serving a working area of the CPU 81 and a ROM 83 having basic control programs recorded therein, an auxiliary storage device such as a HDD (Hard Disk Drive) 84 storing a program relating to the exemplary embodiment of the invention and various data, an I/O interface (I/F) 85 which is an interface with a display device for displaying various information and an input device which is used for input operation by an operator, such as operation buttons and a touch panel, a communication I/F 86 which performs wired or wireless communication with another apparatus, and the like.

The program relating to the exemplary embodiment of the invention may be read out from the auxiliary storage device 84, is expanded in the RAM 82 and is then executed by the CPU 81, so that the respective functions of the prognosis criterion setting apparatus and the prognosis apparatus according to the exemplary embodiment of the invention are implemented on the computer.

Also, even the configuration in which the image forming apparatus 70 itself predicts occurrence of a trouble, which has been described with reference to FIG. 10 above, it is possible to implement the respective functions of the prognosis apparatus according to the exemplary embodiment of the invention on the computer, as described above.

The program according to the exemplary embodiment of the invention may be set up in the computer of this exemplary embodiment by reading out the program from an external storage medium having the program stored therein, such as a CD-ROM, or receiving the program via a communication network and the like.

Also, the invention is not limited to the above exemplary embodiments. For example, the respective functional sections may be implemented by dedicated hardware modules.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
 a first generation unit, wherein for a monitoring item whose detection values, which were detected during an image forming operation in an image forming apparatus in which a trouble occurred within a predetermined time period after an operating condition of the image forming operation was changed, were changed from a normal state to an abnormal state after the operating condition was changed, the first generation unit generates characteristic information indicating a variation state of the detection values which were detected before the operating condition was changed;

a setting unit that sets criterion information which is a criterion to predict occurrence of a trouble, based on the characteristic information generated by the first generation unit;

a second generation unit that generates, for the monitoring item corresponding to the criterion information set by the setting unit, characteristic information indicating a variation state of detection values in an image forming apparatus of a prognosis target; and a prognosis unit that predicts as to whether or not a trouble occurs in the image forming apparatus of the prognosis target after the operating condition is changed in the image forming apparatus of the prognosis target, based on a difference between the criterion information set by the setting unit and the characteristic information generated by the second generation unit.

2. The image forming system according to claim 1, wherein the first generation unit specifies a monitoring item for each change pattern indicating a correspondence relationship between the operating condition before the change and the operating condition after the change, for the monitoring item of each change pattern, the first generation unit generates the characteristic information indicating the variation state of the detection values which are detected before the change of the operating condition in the image forming apparatus in which a change of the operating condition matching each change pattern was made and a trouble occurred within the predetermined time period after the operating condition was changed, and the setting unit associates the change pattern relating to the characteristic information generated by the first generation unit with the criterion information, which is based on the characteristic information.

3. The image forming system according to claim 2, wherein the first generation unit further generates, for the monitoring item of each change pattern, characteristic information indicating a variation state of detection values which are detected before the operating condition was changed in an image forming apparatus in which the change of the operating condition matching each change pattern was made but a trouble has not occurred within the predetermined time period after the operating condition was changed, and if a difference between the characteristic information relating to the image forming apparatus in which the trouble occurred and the characteristic information relating to the image forming apparatus in which the trouble has not occurred is equal to or larger than a threshold value, the setting unit sets the criterion information based on the characteristic information relating to the image forming apparatus in which the trouble occurred and associates the corresponding change pattern with the criterion information.

4. The image forming system according to claim 2, wherein as the operating condition is changed in the image forming apparatus of the prognosis target, the second generation unit generates, for the monitoring item relating to the criterion information corresponding to the change pattern, the characteristic information indicating the variation state of the detection values which are detected before the change of the operating condition in the image forming apparatus of the prognosis target, and the prognosis unit predicts as to whether or not a trouble occurs in the image forming apparatus of the prognosis target, based on a difference between the criterion information corresponding to the change pattern of the operating condition in the image forming apparatus of the prognosis target and the characteristic information generated by the second generation unit.

5. The image forming system according to claim 2, wherein the second generation unit generates, for a monitoring item relating to criterion information corresponding to a change pattern which can occur under a current operating condition in the image forming apparatus of the prognosis target, characteristic information indicating a variation state of the detection values which were detected most recently in the image forming apparatus of the prognosis target, and the prognosis unit predicts as to whether or not a trouble occurs in the image forming apparatus of the prognosis target when the operating condition is changed in the image forming apparatus of the prognosis target, based on a difference between the criterion information corresponding to the change pattern, which can occur under the current operating condition in the image forming apparatus of the prognosis target and the characteristic information generated by the second generation unit.

6. A prognosis criterion setting apparatus comprising:

a generation unit, wherein for a monitoring item whose detection values, which were detected during an image forming operation in an image forming apparatus in which a trouble occurred within a predetermined time period after an operating condition of the image forming operation was changed, were changed from a normal state to an abnormal state after the operating condition was changed, the generation unit generates characteristic information indicating a variation state of the detection values which were detected before the operating condition was changed, and a setting unit that sets criterion information which is a criterion to predict occurrence of a trouble, based on the characteristic information generated by the generation unit.

7. A prognosis apparatus comprising:

an acquisition unit that acquires criterion information which is a criterion to predict occurrence of a trouble, wherein for a monitoring item whose detection values, which were detected during an image forming operation in an image forming apparatus in which a trouble occurred within a predetermined time period after an operating condition of the image forming operation was changed, were changed from a noinial state to an abnormal state after the operating condition was changed, the criterion information is set based on characteristic information indicating a variation state of the detection values which were detected before an operating condition is changed;

a generation unit that, for the monitoring item relating to the criterion information acquired by the acquisition unit, generates characteristic information indicating a variation state of detection values in an image forming apparatus of a prognosis target; and a prognosis unit that predicts as to whether or not a trouble occurs in the image forming apparatus of the prognosis target after the change of the operating condition in the image forming apparatus of the prognosis target, based on a difference between the criterion information acquired by the acquisition unit and the characteristic information generated by the generation unit.

8. An image forming apparatus comprising:
- an acquisition unit that acquires criterion information which is a criterion to predict occurrence of a trouble, wherein for a monitoring item whose detection values, which were detected during an image forming operation in an image forming apparatus in which a trouble occurred within a predetermined time period after an operating condition of the image forming operation was changed, were changed from a normal state to an abnormal state after the operating condition was changed, the criterion information is set based on characteristic information indicating a variation state of the detection values which were detected before an operating condition is changed;
- an image forming unit that forms an image on a recording medium;
- a detection unit that detects a value of the monitoring item relating to the criterion information acquired by the acquisition unit during operation of the image forming unit;
- a generation unit that, for the monitoring item relating to the criterion information acquired by the acquisition unit, generates characteristic information indicating a variation state of the detection values which are detected by the detection unit; and
- a prognosis unit that predicts as to whether or not a trouble occurs in the image forming apparatus of a prognosis target after the change of the operating condition in the image forming apparatus, based on a difference between the criterion information acquired by the acquisition unit and the characteristic information generated by the generation unit.

9. A non-transitory computer readable recording medium storing a program that causes a computer to execute a prognosis criterion setting process, the process comprising:
- for a monitoring item whose detection values, which were detected during an image forming operation in an image forming apparatus in which a trouble occurred within a predetermined time period after an operating condition of the image forming operation was changed, were changed from a normal state to an abnormal state after the operating condition was changed, generating characteristic information indicating a variation state of the detection values which were detected before the operating condition was changed; and
- setting criterion information which is a criterion to predict occurrence of a trouble, based on the generated characteristic information.

10. A non-transitory computer readable recording medium storing a program that causes a computer to execute a prognosis process, the process comprising:
- acquiring criterion information which is a criterion to predict occurrence of a trouble, wherein for a monitoring item whose detection values, which were detected during an image forming operation in an image funning apparatus in which a trouble occurred within a predetermined time period after an operating condition of the image forming operation was changed, were changed from a normal state to an abnormal state after the operating condition was changed, the criterion information is set based on characteristic information indicating a variation state of the detection values which were detected before an operating condition is changed;
- for the monitoring item relating to the criterion information acquired by an acquisition unit, generating characteristic information indicating a variation state of detection values in an image forming apparatus of a prognosis target; and
- predicting as to whether or not a trouble occurs in the image forming apparatus of the prognosis target after the change of the operating condition in the image forming apparatus of the prognosis target, based on a difference between the acquired criterion information and the generated characteristic information.

\* \* \* \* \*